United States Patent
Park et al.

(10) Patent No.: US 7,109,466 B2
(45) Date of Patent: Sep. 19, 2006

(54) PEAK AND BOTTOM DETECTORS IN BURST MODE OPTICAL RECEIVER

(75) Inventors: Gil-Yong Park, Suwon-shi (KR); Hyeon-Cheol Ki, Songnam-shi (KR); Yun-Je Oh, Yongin-shi (KR); Tae-Sung Park, Yongin-shi (KR); Shin-Hee Won, Seoul (KR); Seong-Ha Kim, Yongin-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 206 days.

(21) Appl. No.: 10/694,976

(22) Filed: Oct. 28, 2003

(65) Prior Publication Data

US 2004/0251403 A1  Dec. 16, 2004

(30) Foreign Application Priority Data

Jun. 11, 2003  (KR) .................. 10-2003-0037557

(51) Int. Cl.
*H03F 3/08* (2006.01)
*H03K 5/153* (2006.01)

(52) U.S. Cl. ..................................... 250/214 A; 327/58

(58) Field of Classification Search ............ 250/214 A, 250/214 AG, 221; 327/58
See application file for complete search history.

(56) References Cited

U.S. PATENT DOCUMENTS

| 5,463,345 A | * | 10/1995 | Nagahori et al. ............ 327/374 |
| 5,777,507 A | * | 7/1998 | Kaminishi et al. .......... 327/514 |
| 6,909,082 B1 | * | 6/2005 | Doh et al. ............. 250/214 AG |

* cited by examiner

*Primary Examiner*—Georgia Epps
*Assistant Examiner*—Brian Livedalen
(74) *Attorney, Agent, or Firm*—Cha & Reiter, L.L.C.

(57) ABSTRACT

A peak detector for detecting a peak value of a burst signal in a burst mode optical receiver is disclosed, which comprises: an amplifying terminal configured to reduce an offset of a peak value in a received burst signal using feedback in the peak detector; a transistor that functions as a diode when a positive signal is received from the amplifying terminal; a peak hold capacitor for charging a peak value when the transistor received the positive signal; a signal amplitude detector to monitor the received burst signal amplitude; and a current source to drive a current responsive to the output signal amplitude detector.

9 Claims, 8 Drawing Sheets

OUTPUT OF GCA (SMALL INPUT SIGNAL:40mvp-p)

OUTPUT OF GCA (LARGE INPUT SIGNAL:1Vp-p)

OUTPUT OF SIGNAL SIZE DETECTOR WITH RESPECT
TO SMALL OUTPUT SIGNAL OF GCA

OUTPUT OF SIGNAL SIZE DETECTOR WITH RESPECT
TO LARGE OUTPUT SIGNAL OF GCA

OUTPUT OF PEAK DETECTOR AND BOTTOM DETECTOR
WITH RESPECT TO SMALL SIGNAL

PEAK AND BOTTOM DETECTORS IN BURST MODE OPTICAL RECEIVER

CLAIM OF PRIORITY

This application claims priority to an application entitled "Peak and bottom detectors in burst mode optical receiver," filed in the Korean Intellectual Property Office on Jun. 11, 2003 and assigned Serial No. 2003-37557, the contents of which are hereby incorporated by reference.

BACKGROUND OF THE INVENTION

1. Field of the Invention

The present invention relates to a burst mode optical receiver, and more particularly to peak and bottom detectors in a burst mode optical receiver.

2. Description of the Related Art

In order to more rapidly transmit more information to subscribers, next generation communication systems have required a fiber to the home (hereinafter, referred to as FTTH), in which an optical line is provided in each home. However, the FTTH has financial deployment limitations, in that the cost to replace existing subscriber copper wire networks are significant. To lower costs, passive optical networks (hereinafter, referred to as PONs) have been considered in constructing an FTTH.

The PON includes an optical line termination (hereinafter, referred to as OLT) in a central office, an optical splitter and one or more optical network unit (hereinafter, referred to as ONU) corresponding to subscribers.

When communication from one OLT to a plurality of ONUs is performed, data is transmitted downward simultaneously. When a plurality of ONUs transmit data to the OLT, a time division multiple access (TDMA) technique is used in order to avoid a collision between signals transmitted by each ONU. Further, since each ONU has a different distance from the OLT, each signal transmitted from the ONUs with the same optical output has different optical power in the angle of the receiver of the OLT. Consequently, the receiver of the OLT requires a burst mode optical receiver to process signals with the various optical powers.

FIG. 1 is a circuit diagram of a burst mode optical receiver using a double feedback structure. Referring to FIG. 1, the burst mode optical receiver 60 with the double feedback structure includes a photodiode 62 for converting an optical signal into an electrical current signal proportional to the optical signal, a gain controllable amplifier (hereinafter, referred to as GCA) 64 for amplifying the current signal outputted from the photodiode 62 to a voltage signal, an automatic gain control loop 66 for adjusting an amplifier's gain from a differential output of the GCA 64 by means of a feedback loop and a DC offset control loop 68 for adjusting DC offsets of two differential output signals from the differential output of the GCA 64. The burst mode optical receiver 60 with the feedback structure described above may obtain satisfactory performance/characteristics. However, the feedback structure generally requires quite a long time for feedback stability. Therefore, the feedback stability time may be limitation factor to rapid operation of the burst mode optical receiver. Further, the design of the feedback structure by nature requires a high degree of complexity.

In order to improve such a burst mode optical receiver having the feedback structure, a feed-forward structure was proposed. The burst mode optical receiver with a feed-forward structure is further described in "an instantaneous response CMOS optical receiver IC with wide dynamic range and extremely high sensitivity using feed-forward auto-bias adjustment, IEEE J. Solid state circuit, VOL. 30, NO. 9, pp. 991~997, September 1995".

FIG. 2 is a circuit diagram of a burst mode optical receiver having a feed-forward structure. Referring to FIG. 2, the burst mode optical receiver 70 with the feed-forward structure includes a photodiode 72 for converting an optical signal into an electrical current signal proportional to the optical signal, a gain controllable amplifier (hereinafter, referred to as GCA) 74 for amplifying the current signal outputted from the photodiode 72 to a voltage signal. An output of the GCA 74 is connected to a limiting amplifier 79 located behind of the burst mode optical receiver 70 in order to convert an analog signal into a signal with a digital level.

In order for the limiting amplifier 79 with a differential input structure to reproduce a signal with a 50% duty cycle, the output of the GCA 74 and a reference voltage of the outputted signal are necessary. An automatic threshold controller (hereinafter, referred to as ATC) 80 finds a reference voltage. This reference voltage is an intermediate voltage value of an outputted signal, of the signal outputted from the GCA 74 and enables the reference voltage to be a reference voltage source of the limiting amplifier 79. The ATC 80 finds a peak value and a bottom value of the signal from the signal outputted from the GCA 74. Then, it outputs an intermediate value which is an average value of the peak value and the bottom value. Accordingly, a peak detector 76 and a bottom detector 78 are necessary for the ATC 80. Further, the ATC 80 includes a pair of resistors R1 and R2 for distributing a voltage of a signal passed through the peak detector 76 and the bottom detector 78. The resistors R1 and R2 have a resistance value for generating an intermediate voltage $\{Vref=(Vpeak+Vbottom)/2\}$, that is, a reference voltage (Vref), of the peak voltage and the bottom voltage.

FIG. 3 is a circuit diagram of a peak detector used in a conventional burst mode optical receiver. FIG. 4 is a circuit diagram of a bottom detector. Referring to FIG. 3, the peak detector 90 includes an amplifying terminal 92 for reducing an offset of a peak value, a NPN transistor 94 for functioning as a diode and a peak hold capacitor 96 for charging a peak value. When a burst signal applied through the amplifying terminal 92 rises up to a peak value, the NPN transistor 94 is turned on and the peak hold capacitor 96 is charged up to a peak value.

Further, referring to FIG. 4, a bottom detector 100 has a similar construction to the peak detector. It includes an amplifying terminal 102 for reducing an offset of a peak value, a PNP transistor 104 for functioning as a diode and a peak hold capacitor 106 for charging a bottom value. The bottom detector 100 has a different type of transistor for functioning as a diode in comparison with the peak detector 90 and a direction of diode changes according to the transistor type.

In the operation of the bottom detector 100, when a burst signal applied through the amplifying terminal 102 falls up to a bottom value, the PNP transistor 104 is turned off and the peak hold capacitor 106 is charged up to a bottom value.

Charge time required for rising or falling up to the peak value and the bottom value becomes an important factor in detecting the burst signal, when the peak value and the bottom value of the burst signal are detected in the peak detector 90 and the bottom detector 100 in the burst mode optical receiver.

Conventional peak detectors and bottom detectors have a relatively fast charge time with respect to a small input signal and a relatively slow charge time with respect to a signal with a large input size. Further, the charge time may be fast with respect to a small input signal. However, an overcharge may occur, and thus causing fluctuations. Accordingly, since charge time of an input signal is closely connected with performance of the peak detector and the bottom detector, adjustment of the charge time becomes a very important factor.

SUMMARY OF THE INVENTION

Accordingly, the present invention has been made to reduce or overcome the above-mentioned limitations occurring in the prior art. One object of the present invention is to provide peak and bottom detector circuits in which the peak level and a bottom level current amount is automatically adjusted according to the signal amplitude. In particular, the peak level and a bottom level current is supplied to a peak hold capacitor for maintaining a peak level and a bottom level in a peak detector circuit. Thus, the peak and bottom detector circuits can be charged in very short time.

In accordance with one embodiment of the present invention, a peak detector in a burst mode optical receiver is provided comprising: an amplifying terminal configured to reduce an offset of a peak value in a received burst signal using feedback in the peak detector; a transistor that functions as a diode when a positive signal is received from the amplifying terminal; a peak hold capacitor for charging a peak value when the transistor received the positive signal; a signal amplitude detector to monitor the received burst signal amplitude; and a current source to drive a current responsive to the output signal amplitude detector.

In accordance with another embodiment of the present invention, a bottom detector in a burst mode optical receiver is provided comprising: an amplifying terminal configured to reduce an offset of a bottom value in a received burst signal using feedback in the bottom detector; a diode that is turned on when a negative signal is received from the amplifying terminal; a peak hold capacitor connected to the diode and a voltage source, wherein the peak hold capacitor charges a bottom value when the diode is turned on; a signal amplitude detector to monitor the received burst signal amplitude; and a current source connected in parallel to the peak hold capacitor to drive a current responsive to an output of the signal amplitude detector.

BRIEF DESCRIPTION OF THE DRAWINGS

The present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configurations incorporated herein will be omitted when it may make the subject matter of the present invention rather unclear.

Figure 1:
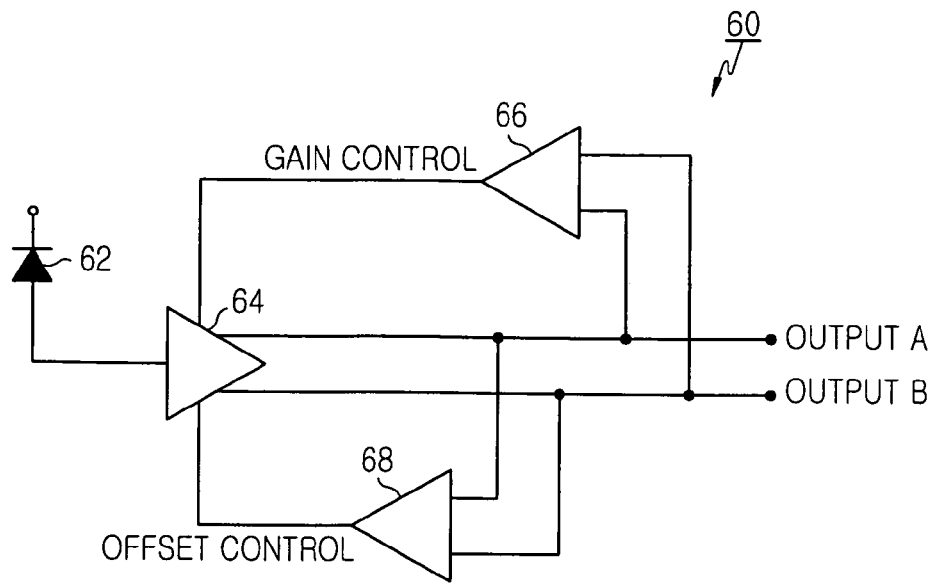
FIG. 1 is a circuit diagram of a burst mode optical receiver using a double feedback structure.
Figure 2:
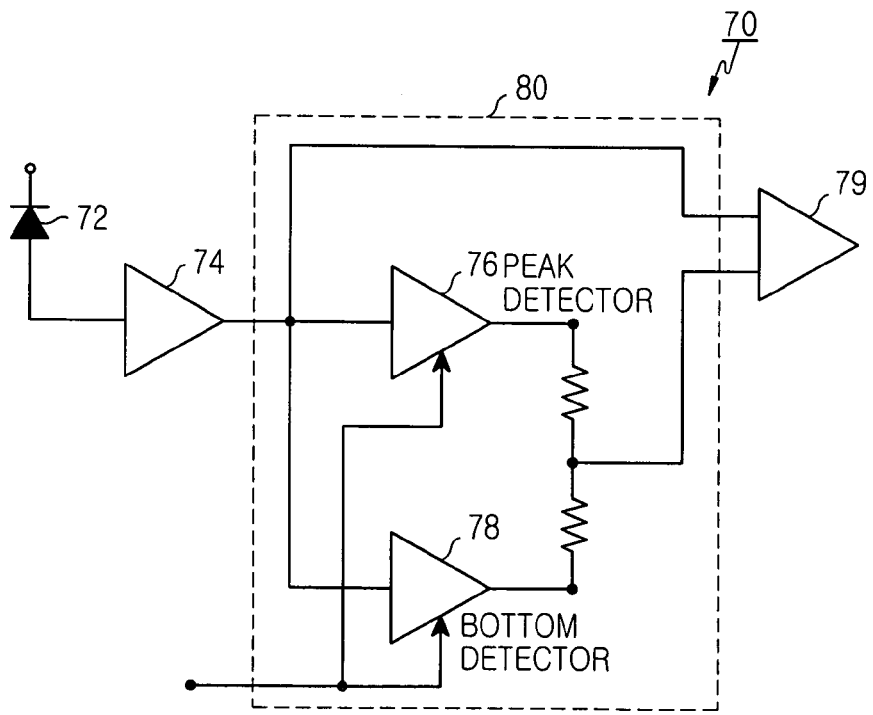
FIG. 2 is a circuit diagram of a burst mode optical receiver having a feed-forward structure.
Figure 3:
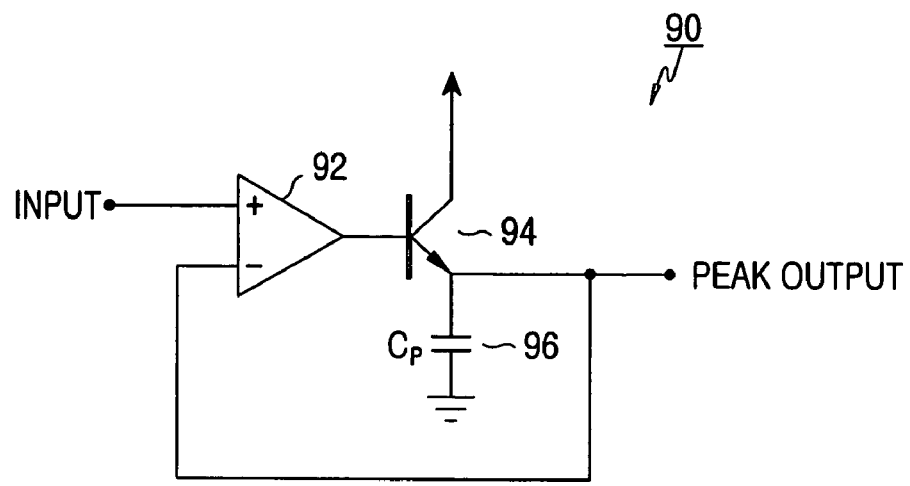
FIG. 3 is a circuit diagram of a peak detector used in a conventional burst mode optical receiver.
Figure 4:
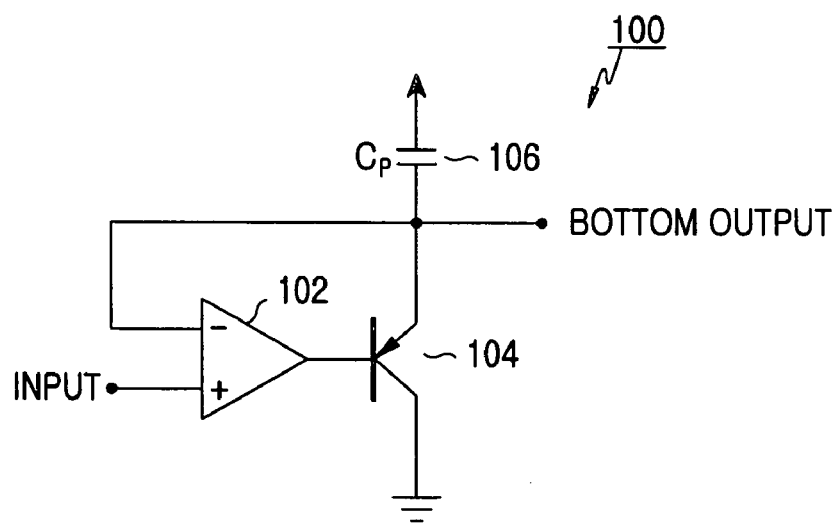
FIG. 4 is a circuit diagram of a bottom detector used in a conventional burst mode optical receiver.
Figure 5:
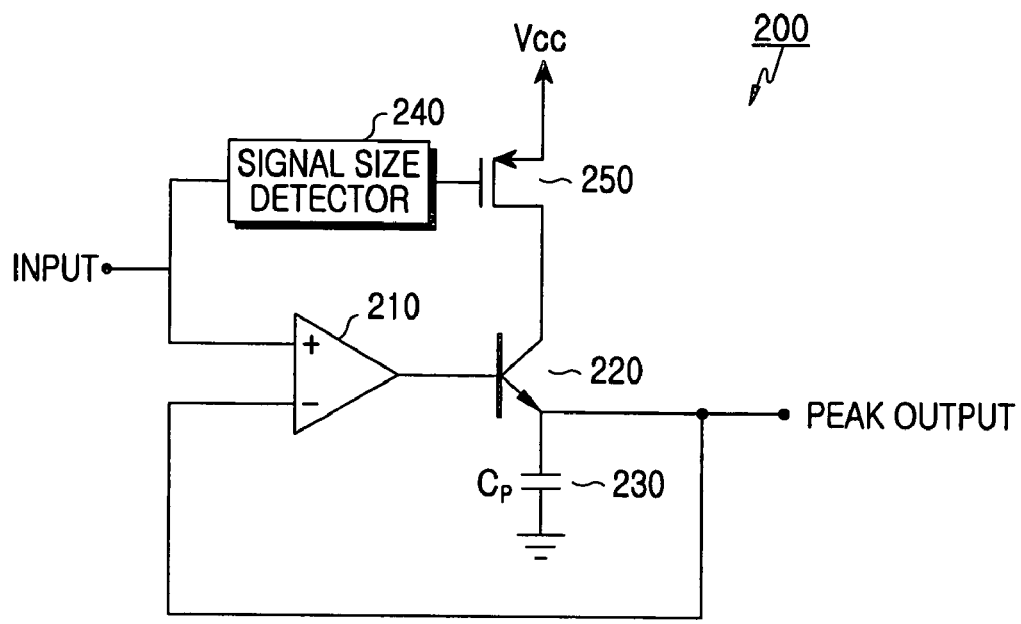
FIG. 5 is a circuit diagram of a peak detector in a burst mode optical receiver according to the present invention.

FIG. 5 is a circuit diagram of a peak detector in a burst mode optical receiver according to the present invention. Referring to FIG. 5, the peak detector 200 in the burst mode optical receiver includes an amplifying terminal 210 for reducing an offset of a peak value, a transistor 220, which functions as a diode, a peak hold capacitor (hereinafter, referred to as Cp) 230 for charging a peak value, a signal amplitude detector 240 for monitoring signal amplitude and generating a control voltage corresponding to the signal amplitude and a current source 250 for driving an actual current according to the output of the signal amplitude detector 240.

A burst signal is applied to the positive input terminal of the amplifying terminal 210. A feedback peak output is inputted to the negative input terminal of the amplifying terminal 210. The amplifying terminal 210's output terminal is connected to a base terminal of the transistor 220. The positive input terminal of the amplifying terminal 210 is connected to an input terminal of the signal amplitude detector 240. The burst signal is applied to the input terminal of the signal amplitude detector 240. An output terminal of the signal amplitude detector 240 is connected to a gate terminal of the current source 250, which is a MOS FET. The source terminal of the MOS FET 250 is connected to a voltage source Vcc. The drain terminal of the MOS FET 250 is connected to a collector terminal of the transistor 220.

Operationally, in the peak detector 200, when a peak value is detected the amplifying terminal 210 reduces a voltage offset caused by a forward voltage of a diode. More particularly, the amplifying terminal 210 reduces the voltage offset as much as the gain of the amplifying terminal if an ultimate detected peak value is fedback. When an increasing positive signal is input through the amplifying terminal 210, the transistor 220 is saturated and the Cp 230 is charged. The signal amplitude detector 240 detects the size of the signal applied to the peak detector 200. It also controls the current amount of the current source 250 according to the detected signal amplitude. When the signal amplitude is small, the signal amplitude detector 240 reduces the current amount of the current source 250 to a very small value, thereby preventing the Cp 230 from being overcharged. In contrast, when the signal amplitude is large, the signal amplitude detector 240 increases the current amount of the current source 250 to a very large value, thereby reducing charge time of the Cp 230. Accordingly, even if the intensity of a burst signal is large, the charge time becomes much shorter.

In addition, the peak detector 200, when a decreasing negative signal is applied, the transistor 220 is cutoff and the Cp 230 discharges the current, which as been charged. In this manner, the peak detector 200 maintains the peak value.

As described above, the present invention controls the current amount of the current source 250 according to the size of the signal detected by the signal amplitude detector 240. This enables a reduction of the charge time of the Cp 230, even if the intensity of the burst signal is large, thereby shortening charge time. Accordingly, (1) when an input signal is small, the signal amplitude detector 240 makes the current amount of the current source 250 small and thus the Cp 230 is slowly charged; (2) when an input signal is large, the signal amplitude detector 240 makes the current amount of the current source 250 large and thus the Cp 230 is fast charged. This is based on the principle that, when a time constant of the Cp 230 is constant, charge time becomes shorter as the intensity of the input signal with respect to a constant time constant grows larger.

Figure 6:
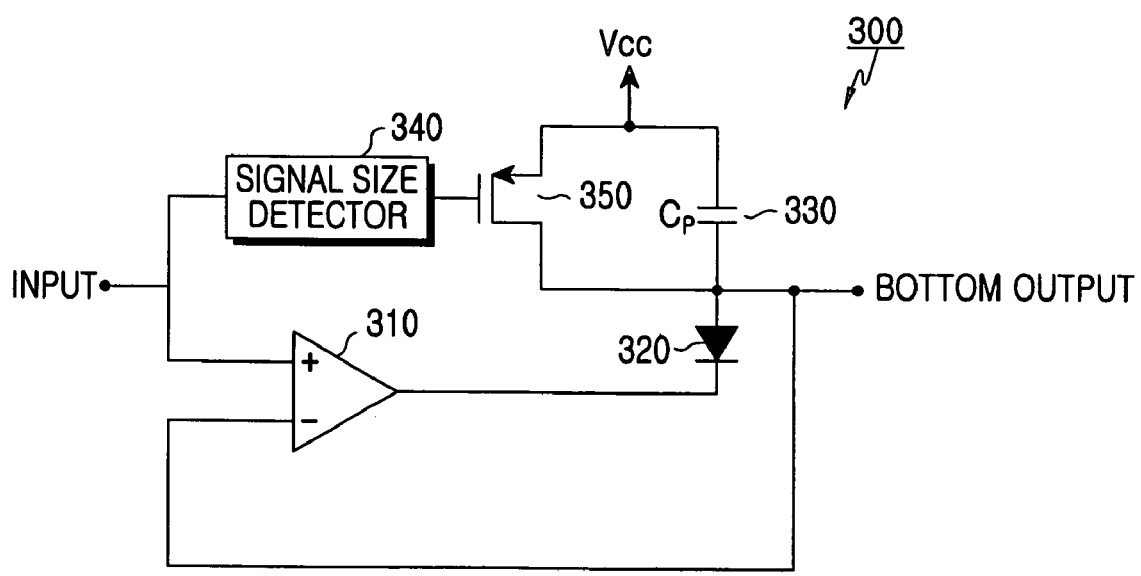
FIG. 6 is a circuit diagram of a bottom detector in a burst mode optical receiver according to the present invention.

FIG. 6 is a circuit diagram of a bottom detector in a burst mode optical receiver according to the present invention.

Referring to FIG. 6, the bottom detector 300 in the burst mode optical receiver includes an amplifying terminal 310 for reducing an offset of a bottom value, a diode 320, a peak hold capacitor (hereinafter, referred to as Cp) 330 for charging a bottom value, a signal amplitude detector 340 for monitoring a signal amplitude and generating a control voltage corresponding to the signal amplitude and a current source 350 for driving an actual current according to an output of the signal amplitude detector 340.

A burst signal is applied to the positive input terminal of the amplifying terminal 310. A bottom output is fedback to the negative input terminal of the amplifying terminal 310. The amplifying terminal 310's output terminal is connected to a negative terminal of the diode 320. The positive input terminal of the amplifying terminal 310 is connected to an input terminal of the signal amplitude detector 340. The burst signal is applied to the input terminal of the signal amplitude detector 340. An output terminal of the signal amplitude detector 340 is connected to a gate terminal of the current source 350 which is a MOS FET. The source terminal of the MOS FET 350 is connected to a voltage source Vcc. The drain terminal of the MOS FET 350 is connected to a positive terminal of the diode 320. The Cp 330 is connected in parallel to the source and drain terminal of the MOS FET 350.

In comparison with the detector 200, the bottom detector 300 has the polarity of the diode 320 is in a reverse state and the Cp 330 is connected to Vcc and not ground. In the bottom detector 300, when a signal decreases in a negative direction, the diode 320 becomes forward biased. Then a charge occurs through the Cp 330. When the signal increases in a positively, the diode 320 becomes reverse biased. Then the Cp 330 discharges the current that has been charged. When the size of the signal detected by the signal amplitude detector 340 is small, the discharge path becomes open. In this manner, overcharge of the Cp 330 is prevented. When the size of the signal detected by the signal amplitude detector 340 is large, the discharge path becomes closed. Thus, the charge time is faster.

Figure 7:
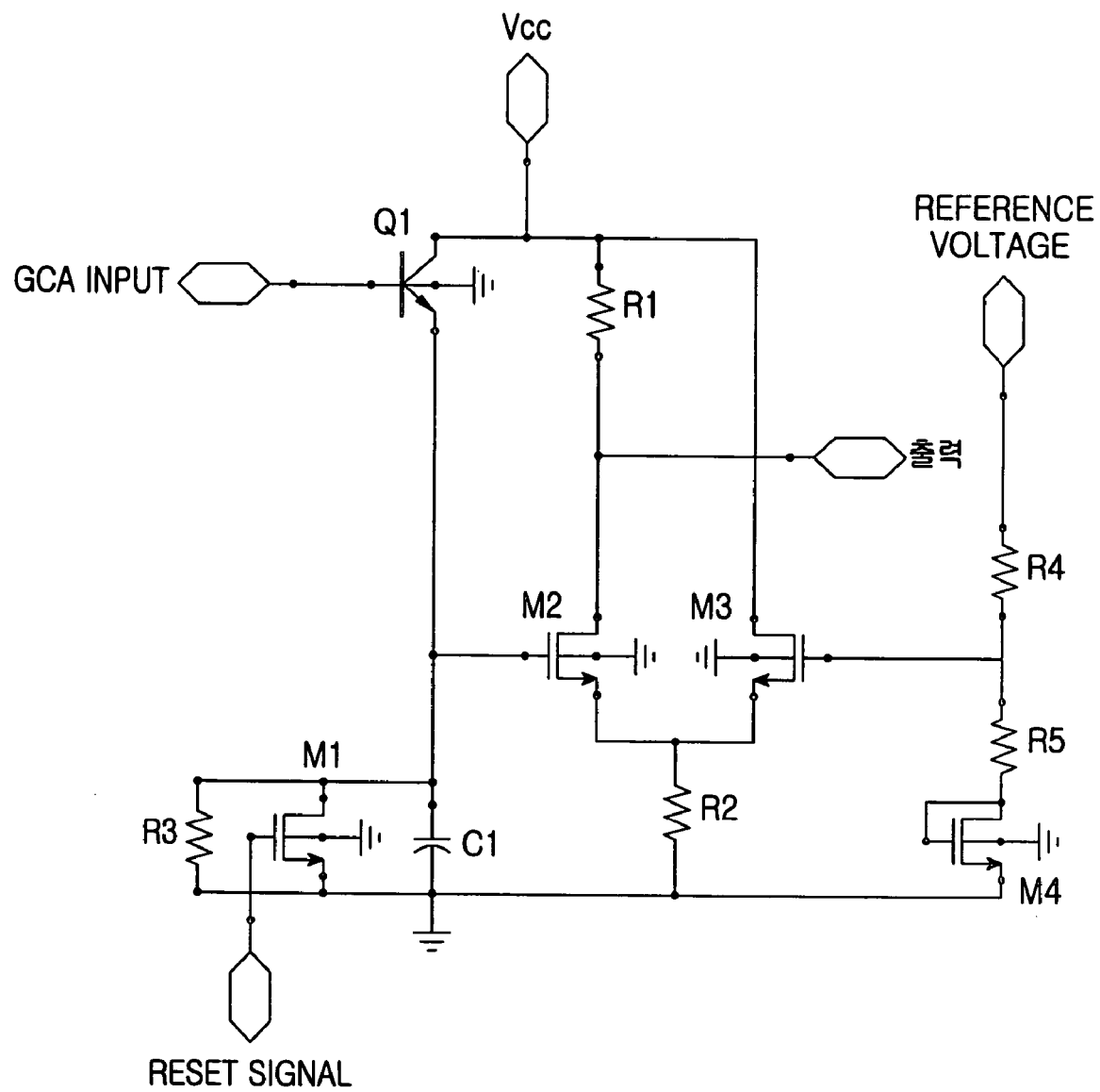
FIG. 7 is a circuit diagram of a signal amplitude detector according to an embodiment of the present invention.

FIG. 7 is a circuit diagram of a signal amplitude detector according to an embodiment of the present invention.

As shown in FIG. 7, the signal amplitude detector according to the present invention includes a Heterojunction Bipolar Transistor (HBT) Q1 in which an input is applied from a GCA to a base terminal. Further, the collector terminal of the Heterojunction Bipolar Transistor (HBT) Q1 is connected to Vcc and one side of a resistor R1. The emitter terminal of the Heterojunction Bipolar Transistor (HBT) Q1 is connected to a capacitor C1. The drain terminal and the source terminal of a MOS FET M1 are connected in parallel to both sides of the capacitor C1. A resistor R3 is connected in parallel to both sides of the capacitor C1. One side of the capacitor C1 is grounded. A reset signal generated in the burst mode optical receiver is applied to a gate terminal of the MOS FET M1.

The gate terminal of MOS FET M2 is connected to the emitter terminal of the Heterojunction Bipolar Transistor (HBT) Q1 and the capacitor C1. The drain terminal of the MOS FET M2 is connected to the other side of the resistor R1. The drain terminal of the MOS FET M2 and the other side of the resistor R1 becomes an output terminal of the signal amplitude detector. Also, the drain and the source terminal of the MOS FET M3 are connected in parallel to the drain and the source terminal of the MOS FET M2. The MOS FET M2 and the MOS FET M3 form a differential amplifier, as known to those skilled in the art. Further, one side of resistor R2 is connected to the source terminal of the MOS FET M3 and the source terminal of the MOS FET M2. The other side of a resistor R2 is grounded. A reference voltage, for instance, 3V, is applied to the gate terminal of the MOS FET M3 through resistor R4. The drain terminal of MOS FET M4 is connected to the gate terminal of the MOS FET M3 through a resistor R5. The drain terminal of a MOS FET M4 is connected to a gate terminal of a MOS FET M4. The source terminal is grounded.

The operation of the signal amplitude detector will be further described below. The input signal from the GCA is applied to the base terminal of the Heterojunction Bipolar Transistor (HBT) Q1. The reference voltage, e.g. of 3V, is applied to the gate terminal of the MOS FET M3 in order to set a reference signal in a bottom level of an input signal. When a small input signal from the GCA is applied to the Heterojunction Bipolar Transistor (HBT) Q1, the signal is charged in the capacitor C1 connected to the Heterojunction Bipolar Transistor (HBT) Q1 and the charge voltage is smaller than 3V. Therefore, according to the principles of a differential amplifier, since the MOS FET M3 is saturated and the MOS FET M2 is not saturated, the voltage, which is close to a supply voltage, is output from the collector terminal of the MOS FET M2. The resulting output signal is shown in FIG. 10.

In contrast, when a large input signal from the GCA is applied to the Heterojunction Bipolar Transistor (HBT) Q1, the signal is charged in the capacitor C1 connected to the Heterojunction Bipolar Transistor (HBT) Q1 and the charge voltage is actually more than 3V. Therefore, the MOS FET M2 is saturated and then the current flows in the collector terminal of the MOS FET M2. Thus, it outputs the voltage, which has been dropped down, to the resistor R1. The resulting output signal is shown in FIG. 11.

Figure 8:
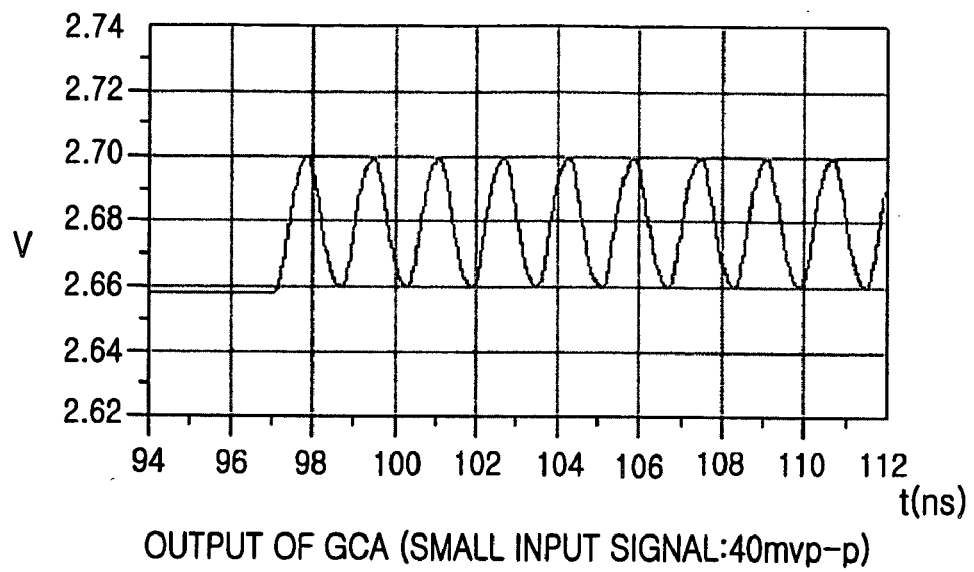
FIGS. 8 and 9 are graphs of a signal input to the signal amplitude detector through a GCA in a burst mode optical receiver.
Figure 9:
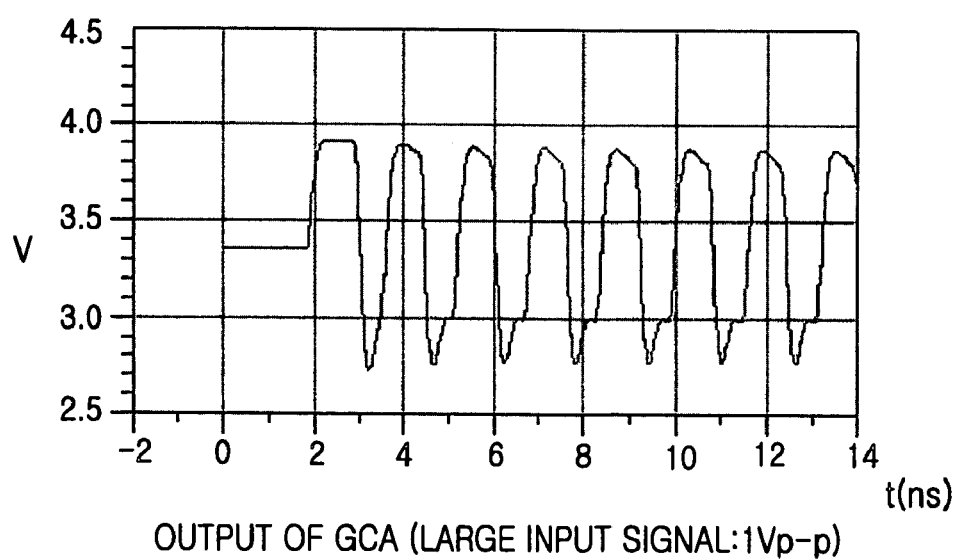

FIGS. 8 and 9 are graphs of a signal input to the signal amplitude detector through a GCA in a burst mode optical receiver. As shown in FIGS. 8 and 9, a signal with a peak value of 40 mV and a signal with a peak value of 1V may be input to the signal amplitude detector.

Figure 10:
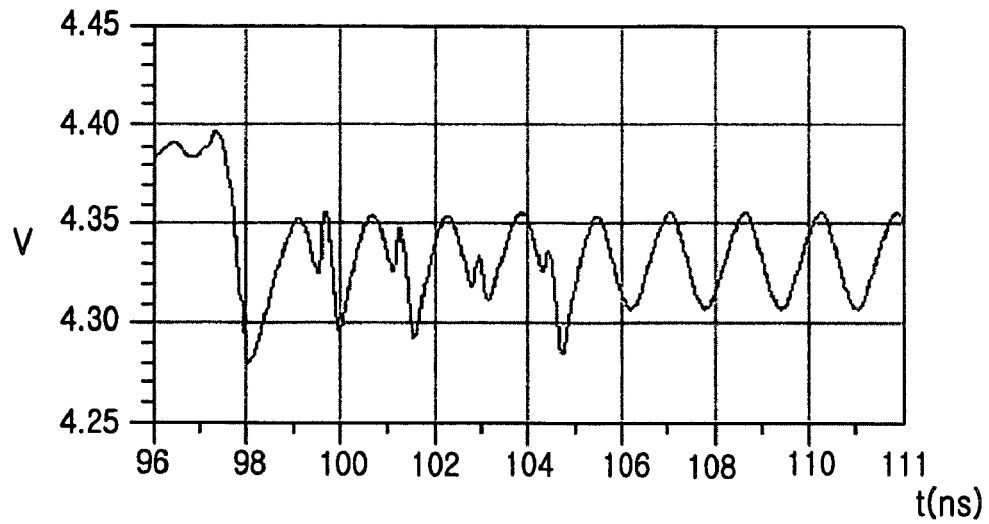
FIGS. 10 and 11 are graphs of a signal detected from an input signal by the signal amplitude detector in the burst mode optical receiver.
Figure 11:
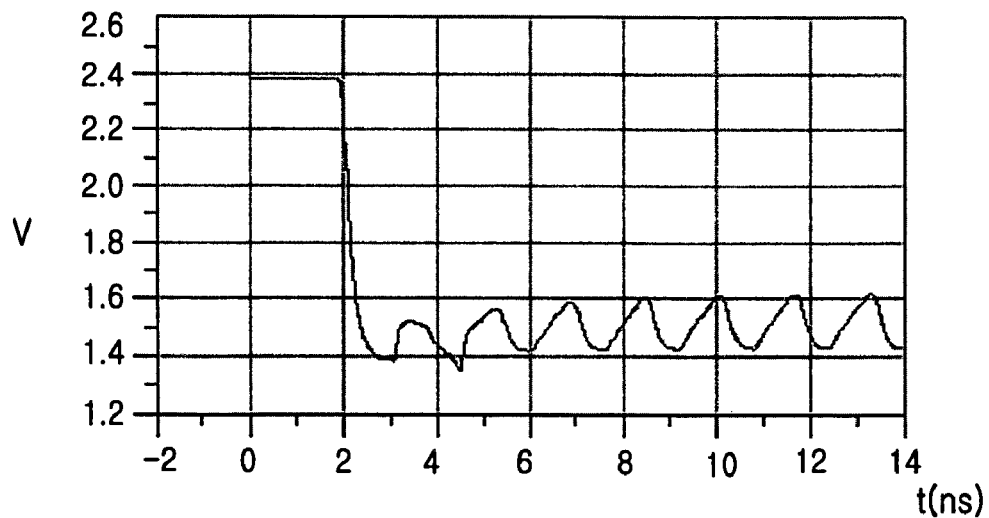

FIGS. 10 and 11 are graphs showing a signal detected from an input signal by the signal amplitude detector in the burst mode optical receiver. As shown in FIGS. 10 and 11, when the input signal is small, the signal amplitude detector 240 makes the current amount of the current source 250 small. Further, when the input signal is large, the signal amplitude detector 240 makes the current amount of the current source 250 large.

Figure 12:
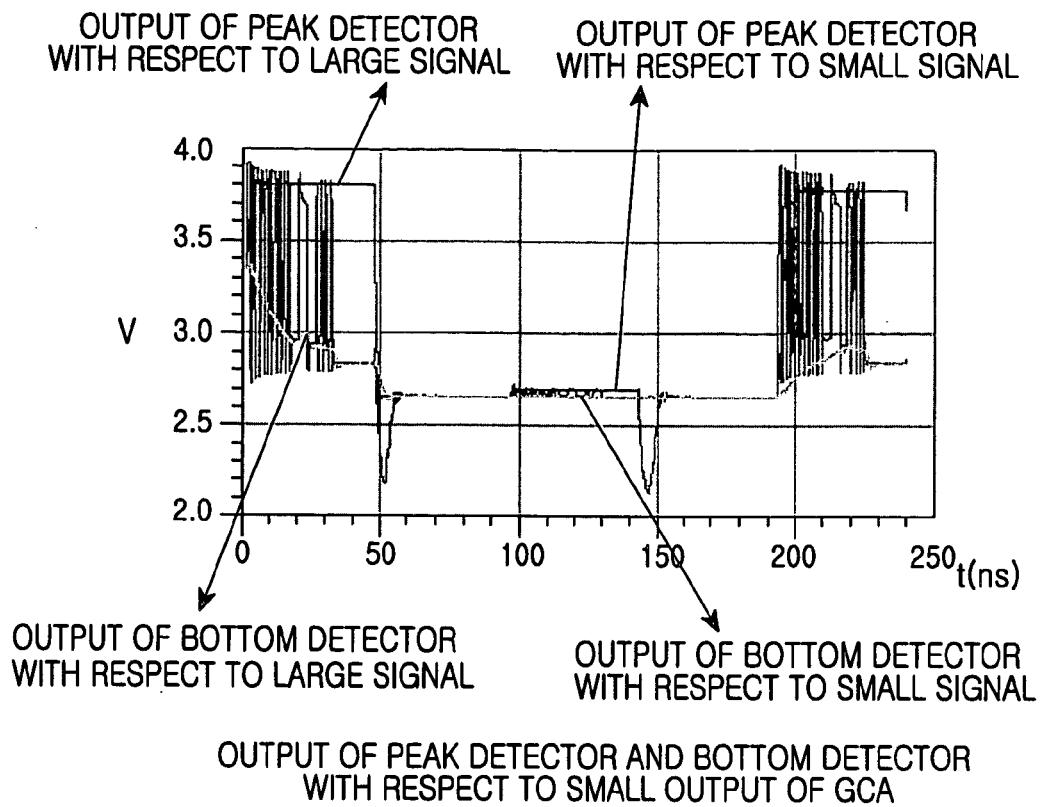
FIG. 12 is a graph showing the output of the peak detector and the bottom detector according to the present invention.
Figure 13:
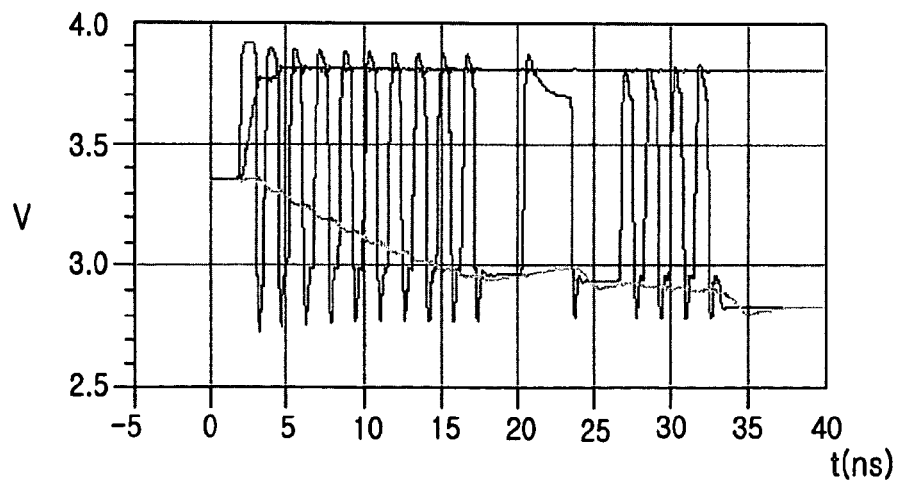
FIGS. 13 and 14 are graphs of the output of the peak detector and the bottom detector to a large input signal and a small input signal, respectively.
Figure 14:
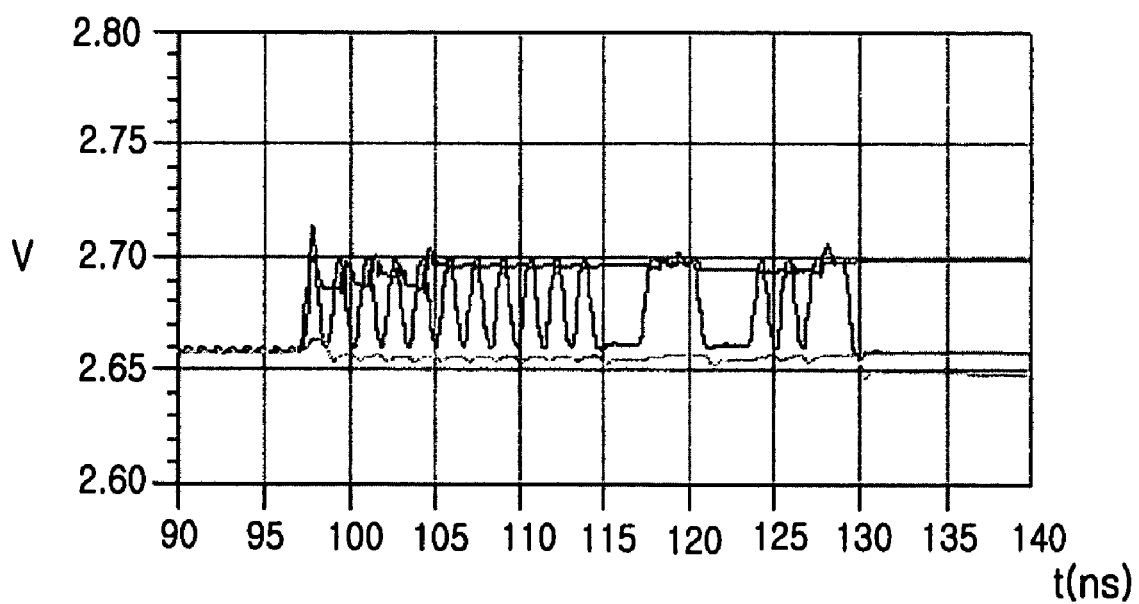

FIG. 12 is a graph showing the output of the peak detector and the bottom detector according to the present invention. FIGS. 13 and 14 are graphs showing the output of the peak detector and the bottom detector with respect to a large input signal and a small input signal, respectively. Referring to FIG. 12 to FIG. 14, the peak detector and the bottom detector can respectively detect a peak value and a bottom value of a burst signal. In this case, the peak detector and the bottom detector according to the present invention are employed in the burst mode optical receiver, thereby detecting a peak value and a bottom value rapidly.

In the present invention, current amount supplied to a Cp for maintaining a peak level and a bottom level in a peak detector circuit can be automatically adjusted according to a signal amplitude. Thus, the burst mode optical receiver has a very rapid response time.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A peak detector for detecting a peak value of a burst signal in a burst mode optical receiver, the peak detector comprising:
    an amplifying terminal configured to reduce an offset of a peak value in a received burst signal using feedback in the peak detector;
    a transistor that functions as a diode when a positive signal is received from the amplifying terminal, wherein the transistor is a Heterojunction Bipolar Transistor (HBT);
    a peak hold capacitor for charging a peak value and maintaining a peak level when the transistor received the positive signal;
    a signal amplitude detector to monitor the received burst signal amplitude and generates a control signal corresponding to the signal amplitude; and
    a current source to drive a current responsive to an output signal amplitude detector.

2. The peak detector for detecting a peak value of a burst signal in a burst mode optical receiver as claimed in claim 1, wherein the current source is responsive to the control signal.

3. The peak detector for detecting a peak value of a burst signal in a burst mode optical receiver as claimed in claim 1, wherein when a negative signal is received in the transistor, the peak hold capacitor discharges.

4. The peak detector for detecting a peak value of a burst signal in a burst mode optical receiver as claimed in claim 1, wherein the signal amplitude detector includes a differential amplifier.

5. The peak detector for detecting a peak value of a burst signal in a burst mode optical receiver as claimed in claim 1, wherein the current source is a MOS FET.

6. A bottom detector for detecting a bottom value of a burst signal in a burst mode optical receiver, the bottom detector comprising:
    an amplifying terminal configured to reduce an offset of a bottom value in a received burst signal using feedback in the bottom detector;
    a diode that is turned on when a negative signal is received from the amplifying terminal; a peak hold capacitor connected to the diode and a voltage source, wherein the peak hold capacitor charges a bottom value when the diode is turned on and maintains the bottom level;
    a signal amplitude detector to monitor the received burst signal amplitude and generates a control signal corresponding to the signal amplitude; and
    a current source connected in parallel to the peak hold capacitor to drive a current 7. The bottom detector for detecting a bottom value of a burst signal in a burst mode optical receiver as claimed in claim 6, wherein the current source is responsive to the control signal.

8. The bottom detector for detecting a bottom value of a burst signal in a burst mode optical receiver as claimed in claim 6, wherein the signal amplitude detector includes a differential amplifier.

9. The bottom detector for detecting a bottom value of a burst signal in a burst mode optical receiver as claimed in claim 6, wherein the current source is a MOS FET.

* * * * *